(12) United States Patent
Wijnands et al.

(10) Patent No.: US 9,876,736 B2
(45) Date of Patent: Jan. 23, 2018

(54) DUAL STACK ROOT BASED MLDP TREE MERGE

(71) Applicant: Cisco Technology, Inc., San Jose, CA (US)

(72) Inventors: Ijsbrand Wijnands, Leuven (BE); Nagendra K. Nainar, Morrisville, NC (US); Rajiv Asati, Morrisville, NC (US); Carlos M. Pignataro, Raleigh, NC (US)

(73) Assignee: Cisco Technology, Inc., San Jose, CA (US)

( * ) Notice: Subject to any disclaimer, the term of this patent is extended or adjusted under 35 U.S.C. 154(b) by 212 days.

(21) Appl. No.: 14/527,289

(22) Filed: Oct. 29, 2014

(65) Prior Publication Data
US 2016/0127269 A1 May 5, 2016

(51) Int. Cl.
| | |
|---|---|
| *H04L 12/26* | (2006.01) |
| *H04L 12/931* | (2013.01) |
| *H04L 12/18* | (2006.01) |
| *H04L 29/12* | (2006.01) |
| *H04L 12/749* | (2013.01) |
| *H04L 12/761* | (2013.01) |

(52) U.S. Cl.
CPC .......... *H04L 49/201* (2013.01); *H04L 12/185* (2013.01); *H04L 45/16* (2013.01); *H04L 45/741* (2013.01); *H04L 61/2069* (2013.01)

(58) Field of Classification Search
CPC ....... H04L 45/16; H04L 12/185; H04L 45/00; H04L 45/48; H04L 45/04; H04L 45/50; H04L 45/60; H04L 45/507; H04L 41/12; H04L 45/54
See application file for complete search history.

(56) References Cited

U.S. PATENT DOCUMENTS

| | | | | |
|---|---|---|---|---|
| 7,529,199 | B1 * | 5/2009 | Wijnands | H04L 45/00 370/256 |
| 8,934,486 | B2 * | 1/2015 | Wijnands | H04L 12/1836 370/390 |
| 2008/0298360 | A1 * | 12/2008 | Wijnands | H04L 12/18 370/389 |
| 2009/0122732 | A1 * | 5/2009 | Brockners | H04L 45/00 370/296 |
| 2009/0271467 | A1 * | 10/2009 | Boers | H04L 45/02 709/201 |
| 2013/0107725 | A1 * | 5/2013 | Jeng | H04L 45/16 370/248 |

* cited by examiner

*Primary Examiner* — Sai Aung
(74) *Attorney, Agent, or Firm* — Parker Ibrahim & Berg LLC; James M. Behmke; Stephen D. LeBarron

(57) ABSTRACT

In one embodiment, a first device in a multicast label distribution (mLDP) network receives a first label mapping message that includes IPv4 and IPv6 addresses of a root node of a multicast tree. The first device also receives a second label mapping message from a second device that identifies the multicast tree and includes one of: the IPv4 address or the IPv6 address of the root node. The first device determines that the second label mapping message is associated with the multicast tree. In response to determining that the second label mapping message is associated with the multicast tree, the first device adds the second device to the multicast tree.

20 Claims, 8 Drawing Sheets

US 9,876,736 B2

DUAL STACK ROOT BASED MLDP TREE MERGE

TECHNICAL FIELD

The present disclosure relates generally to computer networks, and, more particularly, to dual stack, root-based tree merging using a multicast label distribution protocol (mLDP).

BACKGROUND

The latest version of the Internet Protocol (IP), IPv6, is increasingly being used to replace IPv4 in networks. As more and more networks are enabled with IPv6, it is likely that IPv4 and IPv6 may co-exist on some nodes and not on other nodes, for years to come. In addition, it is also possible that IPv4-only and IPv6-only networks/clouds may be connected by dual stack border nodes (e.g., devices that support both protocols), for many years.

With the dual support of IPv4 and IPv6 in networks that use an mLDP-enabled core, certain tree redundancies may occur. For example, a set of leaf nodes/devices may build a multipoint label switched path (MP-LSP) towards the IPv6 address of the root node while another set of leaf nodes/devices may build an MP-LSP towards the IPv4 address of the same root node. Depending on the topology of the network, this may lead to certain intermediary nodes/devices treating overlapping IPv4 and IPv6 trees centered at the same root separately.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, a first device in a multicast label distribution (mLDP) network receives a first label mapping message that includes IPv4 and IPv6 addresses of a root node of a multicast tree. The first device also receives a second label mapping message from a second device that identifies the multicast tree and includes one of: the IPv4 address or the IPv6 address of the root node. The first device determines that the second label mapping message is associated with the multicast tree. In response to determining that the second label mapping message is associated with the multicast tree, the first device adds the second device to the multicast tree.

DESCRIPTION

A communication network may include any number of geographically distributed nodes (e.g., devices of a distributed data center or end-client devices such as personal computers and workstations, or other devices) interconnected by communication links for transporting data between end nodes. Various types of networks are available and can include, for example, local area networks (LANs), wide area networks (WANs), etc. In addition, each of these various types of networks can support various communication technologies such as multicast, and non-multicast (e.g., unicast) communication. Each of these networks can connect the nodes over dedicated private communication links, or dispersed nodes over long-distance communications links such as common carrier telephone lines, optical lightpaths, synchronous optical networks (SONET), synchronous digital hierarchy (SDH) links, and others.

Figure 1:
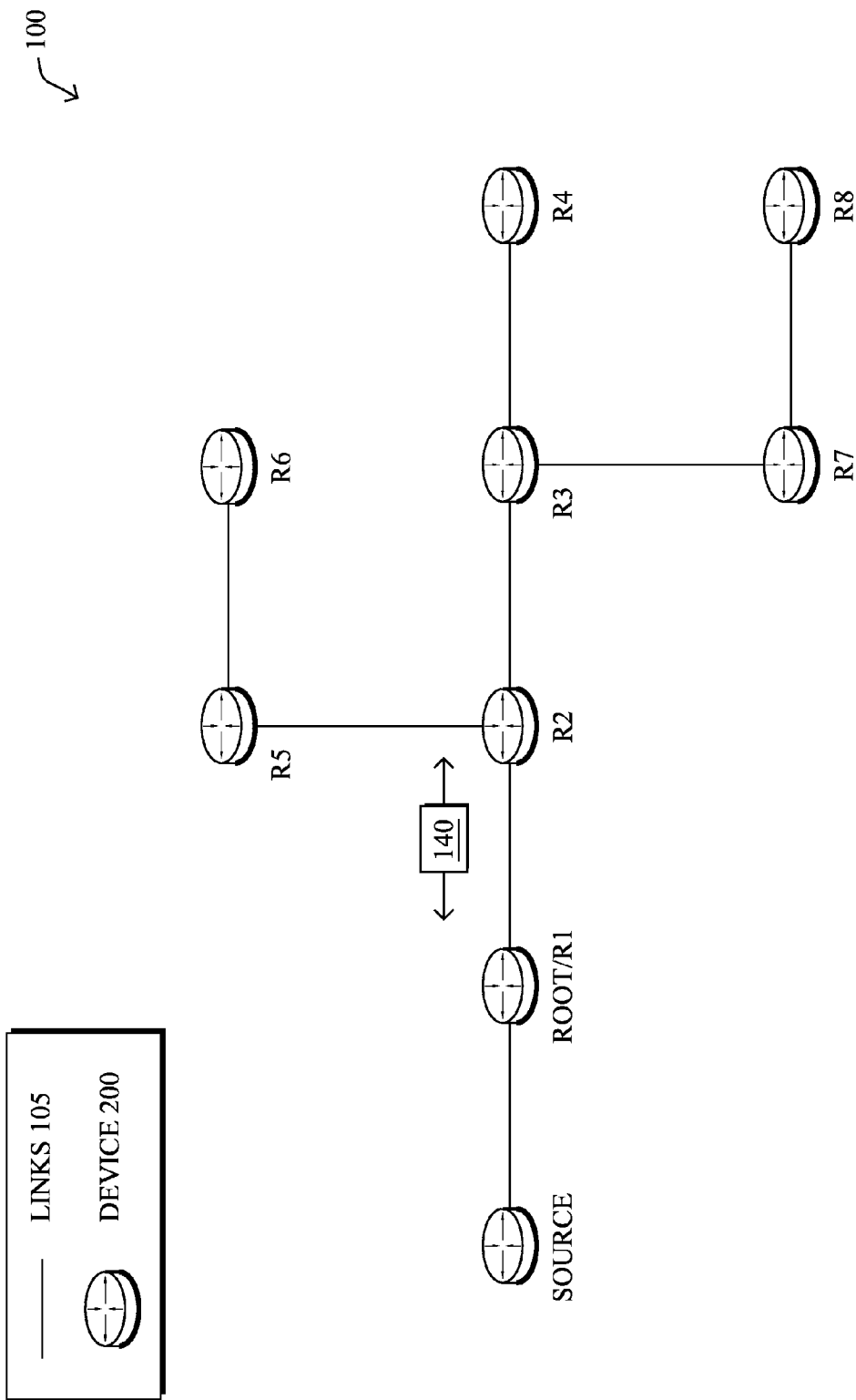
FIG. 1 illustrates an example communication network.

FIG. 1 is a schematic block diagram of an example communication network 100 illustratively including nodes/devices 200 (e.g., labeled as shown, "R1"-"R8," and a "Source" node described in FIG. 2 below) interconnected by various methods of communication. For instance, the links 105 may be wired links or shared media (e.g., wireless links, power-line communication (PLC) links, etc.) where certain nodes 200, such as, e.g., routers, sensors, computers, etc., may be in communication with other nodes 200, e.g., based on distance, signal, strength, current operational status, location, etc. Those skilled in the art will understand that any number of nodes, devices, links, etc. may be used in the computer network, and that the view shown herein is for simplicity. Also, those skilled in the art will further understand that while the network is shown in a certain orientation, particularly with a "root" node R1, the network 100 is merely an example illustration that is not meant to limit the disclosure.

Data packets 140 (e.g., traffic and/or messages sent between the devices/nodes) may be exchanged among the nodes/devices of the computer network 100 using predefined network communication protocols such as certain known wired protocols, wireless protocols, or other protocols, where appropriate. In this context, a protocol consists of a set of rules defining how the nodes interact with each other.

Figure 2:
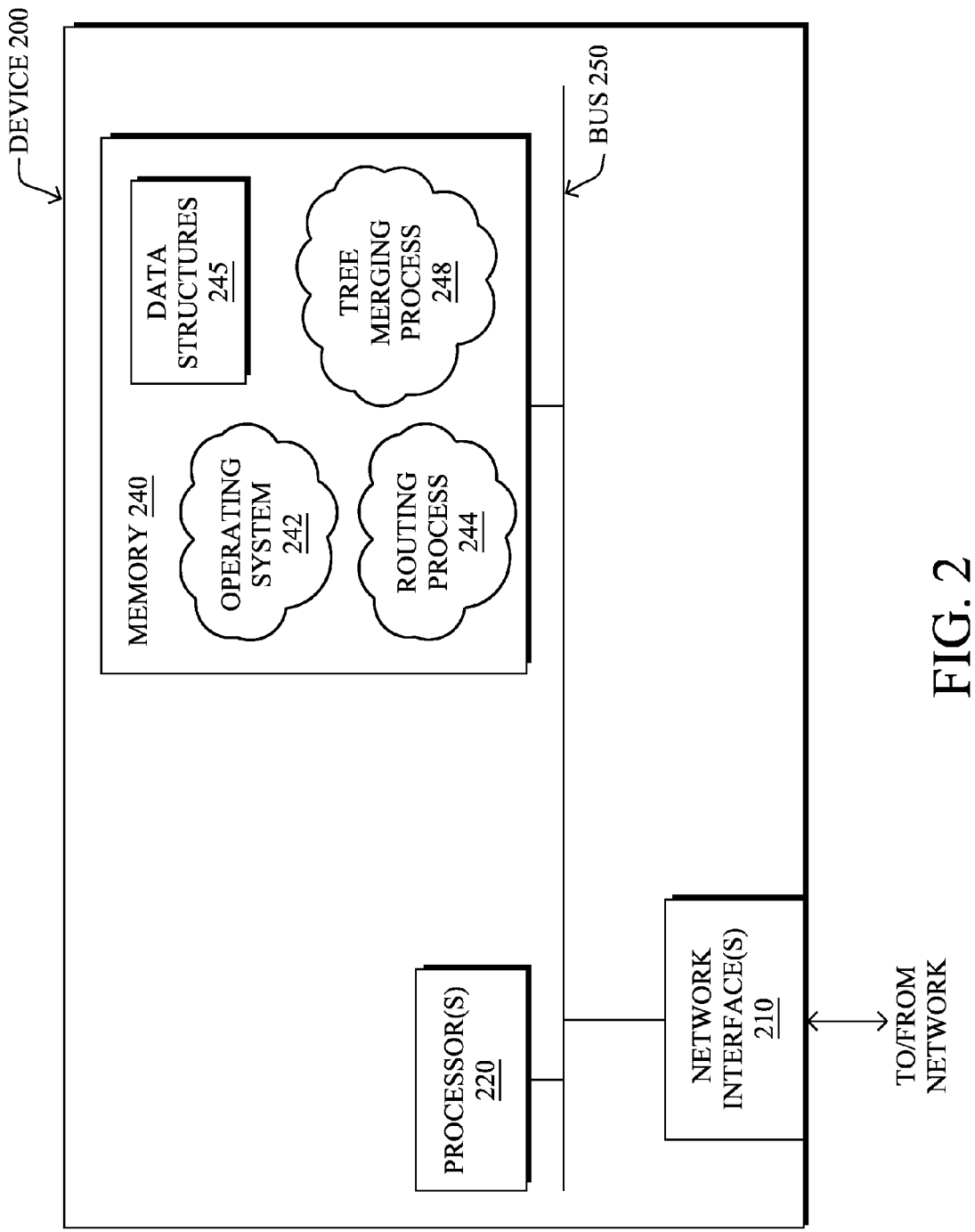
FIG. 2 illustrates an example network device/node.

FIG. 2 is a schematic block diagram of a simplified example device 200 that may be used with one or more embodiments described herein. For example, example device 200 can be any of the nodes shown in FIG. 1, and can include a router, a relay, a switch, etc.

Device 200 may include one or more network interfaces 210 (e.g., wired, wireless, etc.), at least one processor 220, and a memory 240 interconnected by a system bus 250. These network interface(s) 210 includes the mechanical, electrical, and signaling circuitry for communicating data over network 100. Network interfaces 210 may be configured to transmit and/or receive data using a variety of different communication protocols. Note that each device may include two different types of network connections 210, e.g., wireless and wired/physical connections, and that the view herein is merely for illustration.

Memory 240 includes a plurality of storage locations that are addressable by the processor 220 and the network interfaces 210 for storing software programs and data structures associated with the embodiments described herein. Processor 220 may include hardware elements or hardware logic adapted to execute the software programs and manipulate the data structures 245. An operating system 242, portions of which are typically resident in memory 240 and executed by the processor, functionally organizes the device by, inter alia, invoking operations in support of software processes and/or services executing on the device. These software processes and/or services may include routing process/services 244, and a tree merging process 248, as described herein. Note that while processes 244 and 248 are shown in centralized memory 240, additional embodiments provide for either of the processes to be specifically operated within the network interfaces 210.

Note further that while both processes 244 and 248 are shown as stored in memory 240, and therefore implemented as software, these processes may also be implemented in any of the hardware (e.g., electronic circuitry), firmware, software, combination thereof, etc., of device 200, in other embodiments. Alternatively, these processes may be configured on a storage medium for subsequent loading into memory 240. The storage medium can include a computer-readable medium encoded with a computer program, and can be any conventional storage medium that stores the processes thereon in tangible form. Examples of storage media include a floppy disk, a compact disk, a magnetic tape, a read only memory, an optical storage media, universal serial bus (USB) flash drive, etc. Alternatively, storage media can include a random access memory, or other type of electronic storage, located on a remote storage system and coupled to processor 220, via network interface 210.

As will be apparent to those skilled in the art other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

As noted above, the transition from IPv4 to IPv6 may lead to a myriad of different network devices that only support IPv4, that only support IPv6, or are dual stack devices that support both (e.g., border routers that support both IPv4 and IPv6). In some cases, this may lead to situations in which separate multicast trees are created for IPv4 and IPv6, but are rooted at the same root node. As would be appreciated, the techniques herein allow for network topologies in which intermediary transit nodes may determine whether multicast trees are rooted at the same node and, if so, merge the corresponding records in their locally stored routing tables.

Specifically, according to one or more embodiments of the disclosure as described in detail below, a first device in a multicast label distribution (mLDP) network receives a first label mapping message that includes IPv4 and IPv6 addresses of a root node of a multicast tree. The first device also receives a second label mapping message from a second device that identifies the multicast tree and includes one of: the IPv4 address or the IPv6 address of the root node. The first device determines that the second label mapping message is associated with the multicast tree. In response to determining that the second label mapping message is associated with the multicast tree, the first device adds the second device to the multicast tree.

Illustratively, the techniques described herein may be performed by hardware, software, and/or firmware, such as in accordance with the tree merging process 248, which may include computer executable instructions executed by the processor 220 (or independent processor of interfaces 210) to perform functions relating to the techniques described herein, e.g., in conjunction with routing process 244. For example, the techniques herein may be treated as extensions to conventional protocols, such as the various networking protocols.

Figure 3:
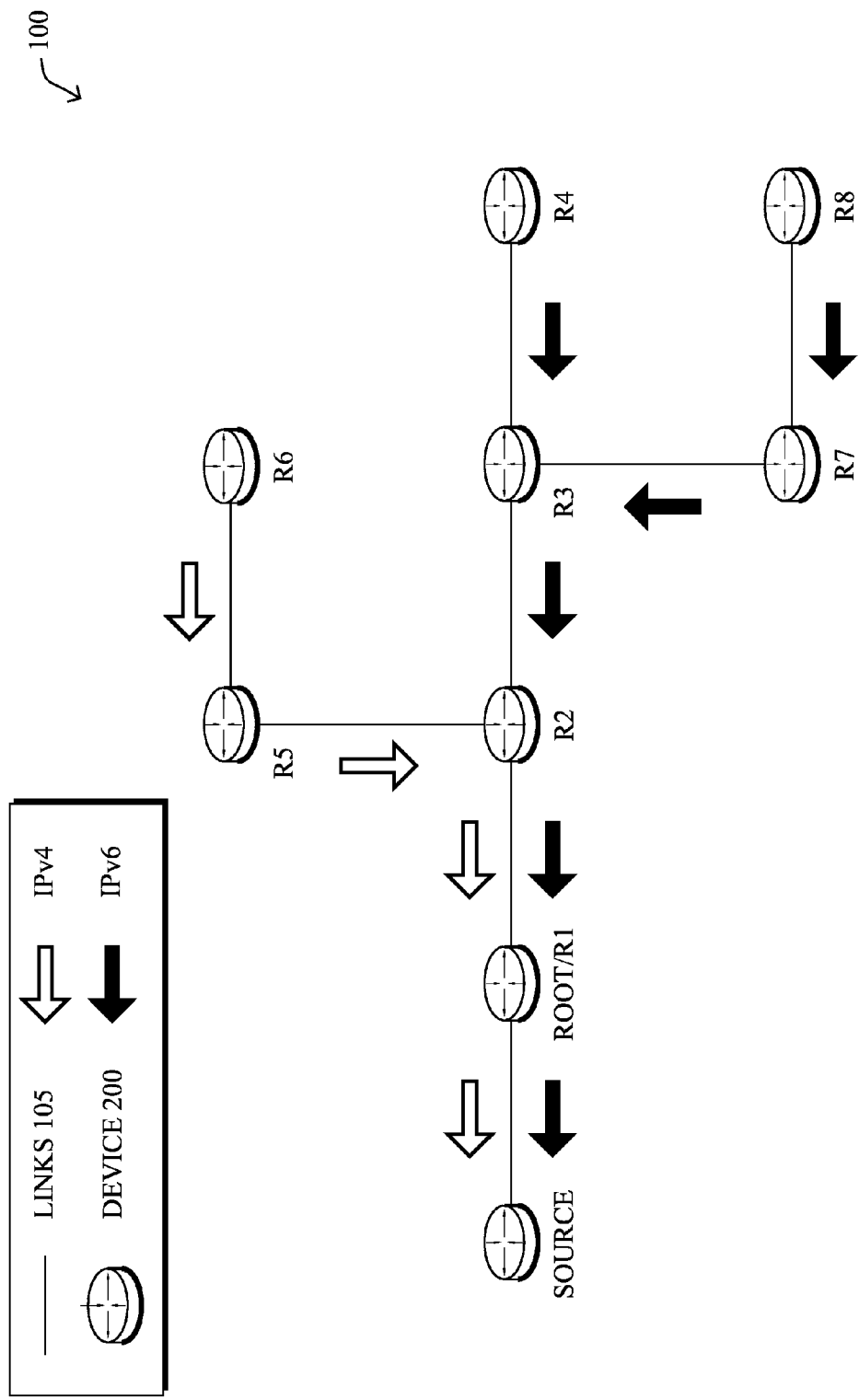
FIG. 3 illustrates the communication network of FIG. 1 with dual IPv4 and IPv6 support.

Operationally, FIG. 3 illustrates an example of network 100 in which different devices support different protocols. In particular, if mLDP is enabled at the core of network 100, a set of leaf nodes may build a multipoint label switched path (MP-LSP) towards the IPv6 address of a root node, while other leaf nodes may build a MP-LSP towards the IPv4 address of the root node. For example, as shown, assume that devices R1-R4 are dual stack nodes that support both IPv4 and IPv6, that nodes R5-R6 support only IPv4, and that nodes R7-R8 support only IPv6. Also, assume that leaf node R7 receives data from the source node via an IPv6-based border gateway protocol (BGP), thereby using the IPv6 address of the root device, R1. Conversely, assume that leaf node R5 receives data from the source node via an IPv4-based BGP and uses the IPv4 address of the root device, R1.

As would be appreciated in the topology shown, device R2 may receive mLDP messages initiated by devices R6 and R8 that include the same opaque parameters (e.g., parameters that uniquely identify a multicast tree/channel rooted at R1), but respectively use the IPv4 and IPv6 addresses of R1. In some cases, such as with a typical dual stack router, R2 may treat these messages as corresponding to different multicast trees. Thus, the link between R1 and R2 may consume double the bandwidth that is needed to support the multicast from the source device. According to various embodiments, dual stack devices R1, R2, R3, and/or R4 may be configured to analyze received label mapping messages to identify trees that have the same root but use different addresses (e.g., IPv4 versus IPv6 addresses) and, if so, merge the trees.

According to various embodiments, the various network devices may be configured to support the tree merging functionality disclosed herein with respect to the dual stack devices. First, provider edge routers that support the functionality herein may be required to advertise IPv4 root addresses as a new BGP attribute to their IPv6-enabled peers. Second, each device may be configured to advertise its ability to support the tree merge feature as advertised mLDP capabilities.

Figure 4:
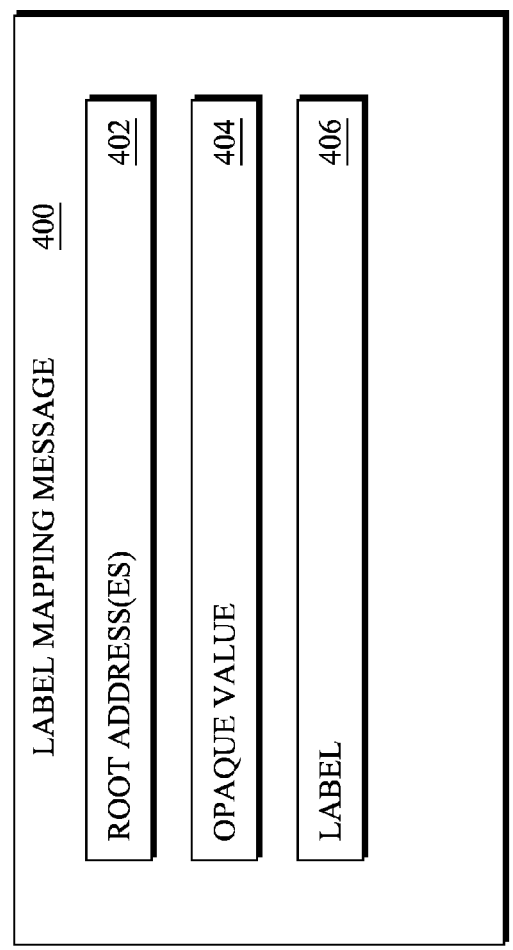
FIG. 4 illustrates an example label mapping message.

FIG. 4 illustrates an example label mapping message 400, according to various embodiments. For example, message 400 may be an mLDP label mapping message that includes various data to support the tree merging process described herein. As shown, label mapping message 400 may include a root address field 402 configured to convey both the IPv4 and IPv6 addresses of the tree root. Label mapping message 400 may also include an opaque value field 404. In general, opaque value field 404 may include data that uniquely identifies a particular multicast tree. For example, opaque value field 404 may include an (S, G) parameter that identifies the source (S) and the source-specific multicast destination address (G). In some embodiments, fields 402 and 404 may be part of a forwarding equivalence class (FEC) type-length-value (TLV). In addition, label mapping message 400 may include a label field 406 via which a label may be assigned to message 400 for purposes of label switching within the network.

Figure 5A:
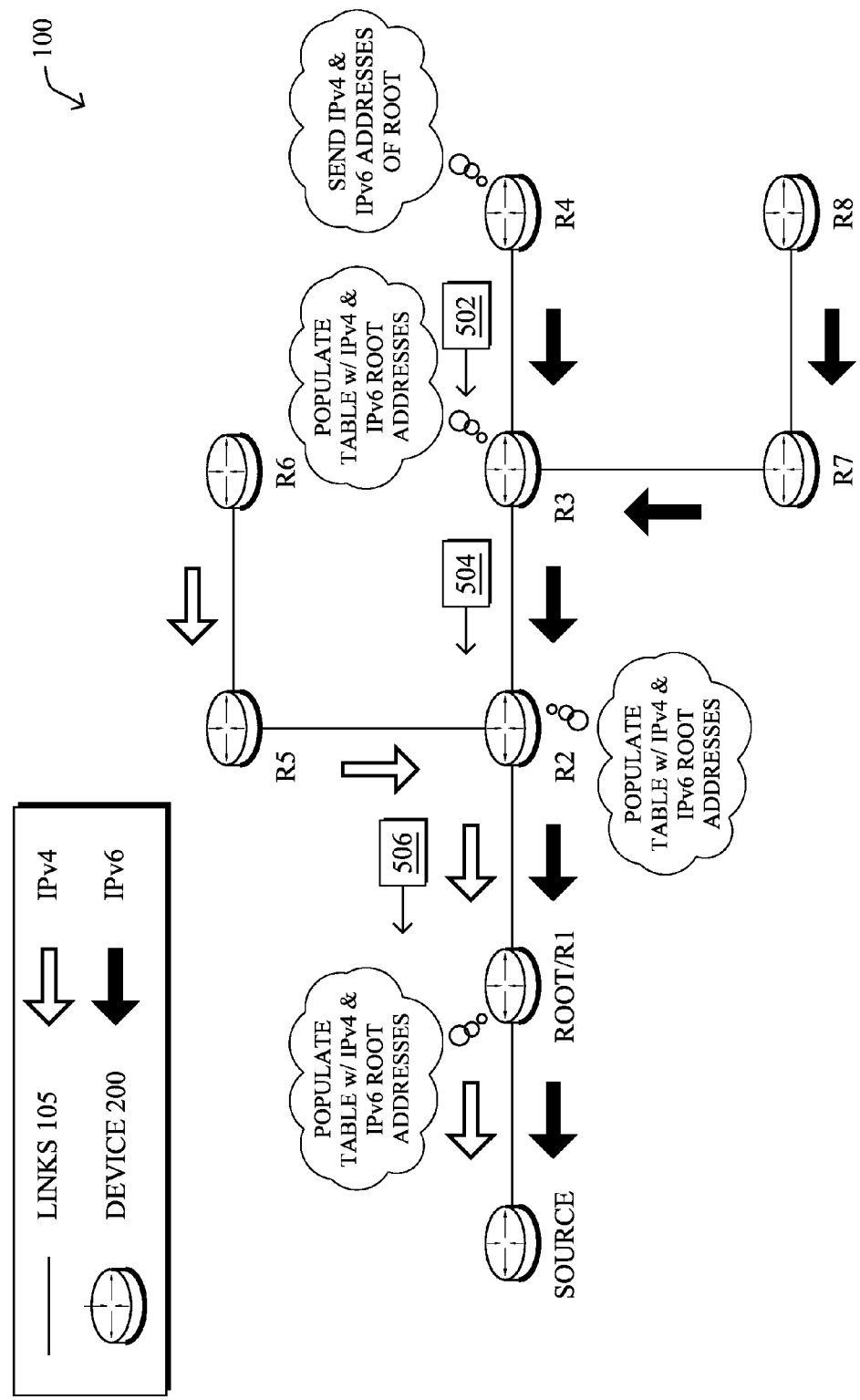
FIGS. 5A-5C illustrate examples of multicast trees being merged.
Figure 5B:
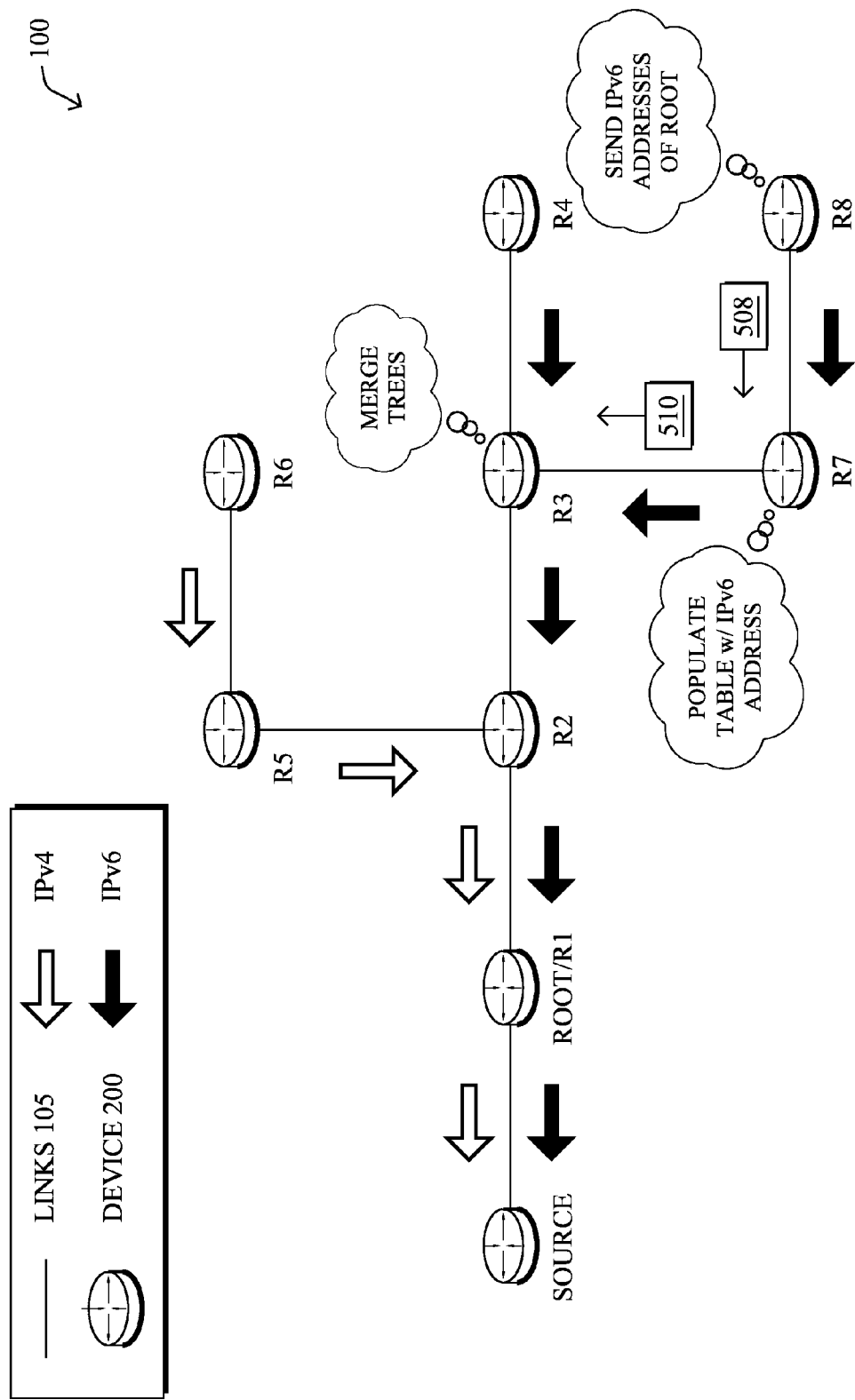
Figure 5C:
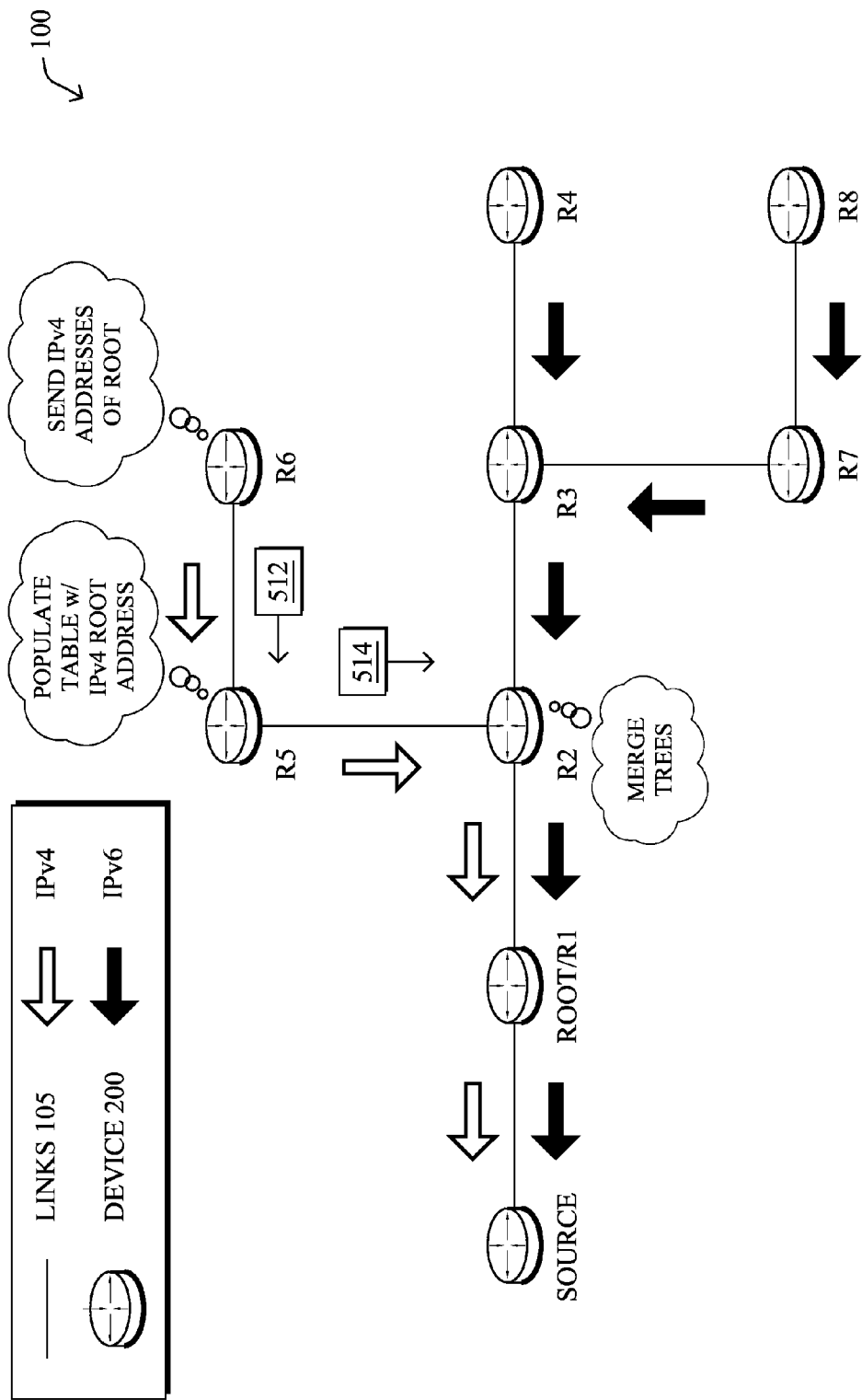

Referring now to FIGS. 5A-5C, examples of multicast trees being merged are shown, according to various embodiments. In FIG. 5A, the dual stack devices R4-R2 may generate label mapping messages 502-504, in accordance with the format of label mapping message 400 described above. For example, device R4 may send a label mapping message 502 that includes the following:

TABLE 1

| Label Mapping Message 502 | |
| --- | --- |
| Field | Value |
| Root Address(es) | 2001::1; 192.168.1.1 |
| Opaque | S, G |
| Label | 400 |

In other words, label mapping message 502 may include an FEC that identifies both the IPv4 and IPv6 root addresses of the multicast tree, as well as the Opaque value associated with the tree. In response to receiving label mapping message 502, dual stack device R5 may store the corresponding information in its routing table as follows:

TABLE 2

| R3 Routing Table | | |
| --- | --- | --- |
| Opaque | ROOT | Downstream Device |
| O1 | 2001::1; 192.168.1.1 | R4 |

In addition, R3 may store an association between the label of message 502 received from R4 (e.g., "400") and the label of message 504 (e.g., "300") sent by R3 to R2 in a local Label Forwarding Information Base (LFIB) table as follows:

TABLE 3

| R3 LFIB Table | |
| --- | --- |
| 300 | 400 |

As shown in FIG. 5A, R3 and R2 may continue the process of forwarding label mapping messages upstream until they reach the root node, R1. For example, device R3 may send label mapping message 504 to device R2 that includes the following information:

TABLE 4

| Label Mapping Message 504 | |
| --- | --- |
| Field | Value |
| Root Address(es) | 2001::1; 192.168.1.1 |
| Opaque | S, G |
| Label | 300 |

In response to receiving label mapping message 504, device R2 may store the following in its local tables:

TABLE 5

| R2 Routing Table | | |
| --- | --- | --- |
| Opaque | ROOT | Downstream Device |
| O1 | 2001::1; 192.168.1.1 | R3 |

TABLE 6

| R2 LFIB Table | |
| --- | --- |
| 200 | 300 |

Similarly, R2 may send label mapping message 506 to the root device R1 including the following information:

TABLE 7

| Label Mapping Message 506 | |
| --- | --- |
| Field | Value |
| Root Address(es) | 2001::1; 192.168.1.1 |
| Opaque | S, G |
| Label | 200 |

In response to receiving label mapping message 506, the root node R1 may then store the corresponding information in its local tables, in a similar manner. Notably, through the propagation of label mapping messages 502-506 through dual stack devices R4-R2, each of these devices now stores both the IPv4 and the IPv6 addresses of the root device R1.

Referring now to FIG. 5B, the IPv6-only devices R7-R8 in network 100 may also propagate label mapping messages 508-510 towards the root device R1, in a similar manner as in the example of FIG. 5A. In other words, device R8 may send label mapping message 508 to R7. In response, R7 may store the information in label mapping message 508 in its local tables and send a corresponding label mapping message 510 to device R3. Example label mapping messages 508-510 may be as follows:

TABLE 8

| Label Mapping Message 508 | |
| --- | --- |
| Field | Value |
| Root Address | 2001::1 |
| Opaque | S, G |
| Label | 800 |

TABLE 9

| Label Mapping Message 510 | |
| --- | --- |
| Field | Value |
| Root Address | 2001::1 |
| Opaque | S, G |
| Label | 700 |

As shown above in Tables 8-9 and in contrast to the example of FIG. 5A, label mapping messages 508-510 may only include the IPv6 address of the root node R1. In a typical mLDP network, R3 would then store the information in label mapping message 510 in its local tables as separate entries and propagate new label mapping messages up to the root device R1. Thus, devices R3-R1 may maintain overlapping trees for the same multicast from the source device, leading to the use of additional resources along these links (e.g., by duplicating packet transmissions along overlapping links, etc.).

According to various embodiments, dual stack devices R4-R1 may be configured to determine whether a label mapping message from an IPv4-only or IPv6 only device corresponds to existing entries in their local routing tables. For example, R3 may analyze the root address and opaque values of label mapping message 510, to determine whether message 510 corresponds to any existing local table entries. In other words, dual stack device R3 may determine whether the IPv6-only address of root device R1 and opaque value in message 510 matches its existing table entries and, if so, merge the information into the existing entry. For example, R3 may merge the information of label mapping message 510 into its table entries as follows:

TABLE 10

R3 Routing Table - Updated

| Opaque | ROOT | Downstream Device |
|---|---|---|
| O1 | 2001::1; 192.168.1.1 | R4, R7 |

TABLE 11

R3 LFIB Table - Updated

| 300 | 400, 700 |
|---|---|

In various embodiments, after R3 merges the information of label mapping message 510 into its existing table entries, R3 may not send a corresponding label mapping message to R2. In other words, the propagation of label mapping messages 508-510 may end at R3. R3 may then simply forward any downstream data from the source device towards R8 and include the corresponding downstream label for replication.

Referring now to FIG. 5C, dual stack device R2 may perform a similar function with respect to the IPv4-only devices R5-R6 as that of R3 in the example of FIG. 5B. In particular, assume that IPv4-only devices R6 and R5 propagate label mapping messages 512-514 towards the root node R1. Messages 512-514 may include the following information:

TABLE 13

Label Mapping Message 512

| Field | Value |
|---|---|
| Root Address | 192.168.1.1 |
| Opaque | S, G |
| Label | 600 |

TABLE 15

Label Mapping Message 514

| Field | Value |
|---|---|
| Root Address(es) | 2001::1 |
| Opaque | S, G |
| Label | 500 |

In response to receiving label mapping message 514, dual stack device R2 may then determine whether the contents of label mapping message 514 correspond to any existing table entries stored by R2 (e.g., by analyzing the root address and opaque values in message 514). If so, R2 may merge the contents of label mapping message 514 into its existing table entries as follows:

TABLE 16

R2 Routing Table - Updated

| Opaque | ROOT | Downstream Device |
|---|---|---|
| O1 | 2001::1; 192.168.1.1 | R4, R5 |

TABLE 17

R2 LFIB Table - Updated

| 300 | 400, 500 |
|---|---|

In various embodiments, the propagation of label mapping messages 512-514 towards the root device R1 may end at device R2 after R2 merges the contents of message 514 with its existing table entries. In other words, R2 may not send a corresponding label mapping message upstream to root device R1 and simply use its local entries to forward data from the source device downstream towards R6 as needed.

While the examples of FIGS. 5A-5C are described with respect to label mapping messages being propagated first along the dual stack devices R4-R1, the embodiments herein, also support the opposite situations. For example, label mapping messages originating from R8 may be propagated up to R1 before label mapping messages originating from R4 are propagated. In such a case, when the label mapping messages reach dual stack device R3, device R3 may merge the label mapping message originating from R4 into the table entries corresponding to the label mapping messages originating from the IPv6-only devices R7-R8.

Figure 6:
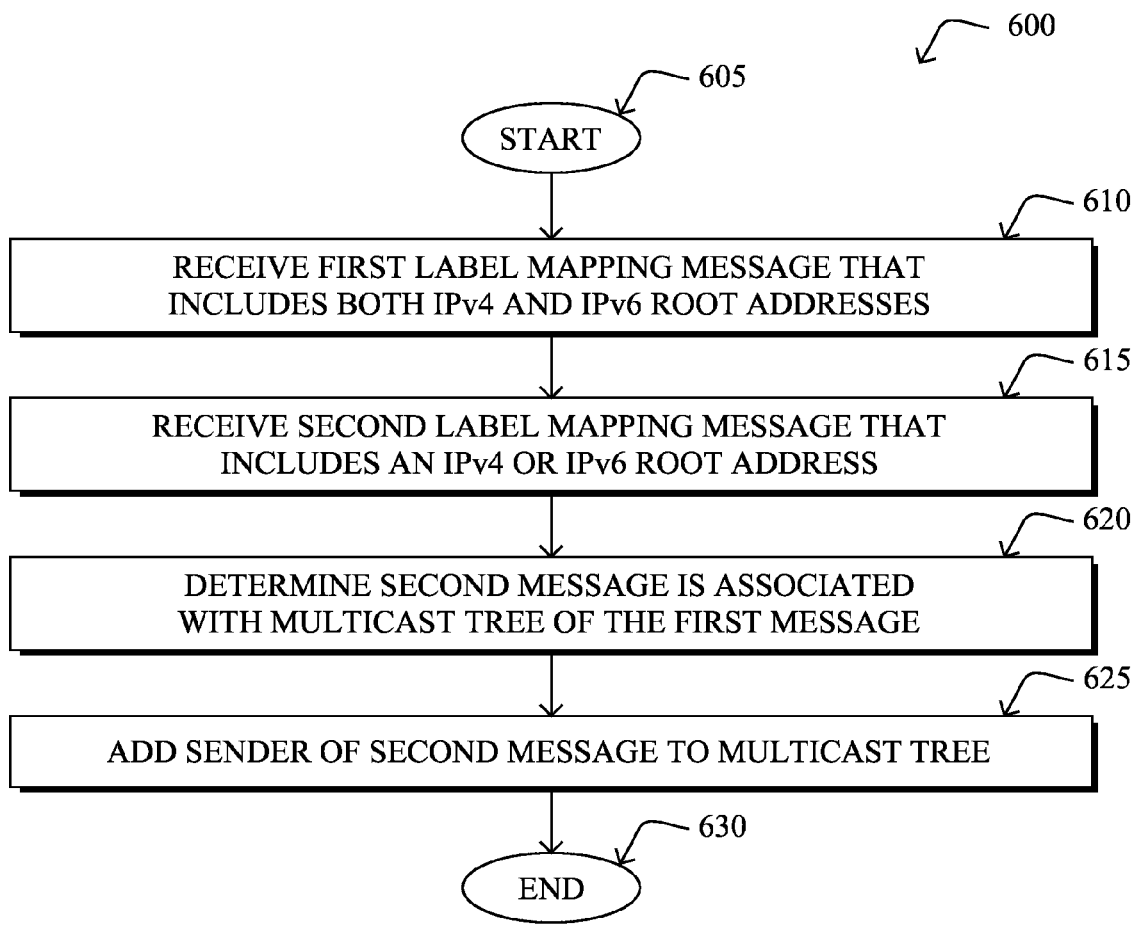
FIG. 6 illustrates an example simplified procedure for merging multicast trees.

FIG. 6 illustrates an example simplified procedure 600 for merging multicast tree, in accordance with one or more embodiments described herein. The procedure 600 may start at step 605, and continues to step 610, where, as described in greater detail above, a network device/node (e.g., a router, etc.) receives a first label mapping message that includes both the IPv4 and the IPv6 address of a root node of a multicast tree. For example, as described above, dual stack devices R3 and R2 may receive label mapping messages that identify both the IPv4 and the IPv6 addresses of the root device R1.

At step 615, the device receives a second label mapping message that includes either the IPv4 address or the IPv6 address of the tree root, as described in greater detail above. In other words, according to various embodiments, the device that receives the first and second label mapping messages may be a dual stack device that borders an IPv4-only or IPv6-only device. Accordingly, such a message may only identify the IPv4 address of the tree root or only identify only the IPv6 address of the tree root. For example, as discussed above, dual stack device R2 may receive label mapping message 514 from IPv4-only device R5. In another example, dual stack device R3 may receive label mapping message 510 from IPv6-only device R7.

At step 620, the device may determine that the second label mapping message is associated with the multicast tree indicated by the first label mapping message, as detailed above. For example, as discussed above with respect to FIG. 5C, dual stack device R2 may determine that label mapping message 514 from IPv4-only device R5 is associated with the same multicast tree indicated by label mapping message 504 received from dual stack device R3. In various embodiments, such a determination may be made by the device by comparing the indicated root addresses and/or the opaque values included in the first and second label mapping messages.

At step 625, the device may add the sender of the second label mapping message to the multicast tree associated with the first label mapping message, as described in greater detail above. In various embodiments, the device may add an identifier for the sender to an existing routing table entry stored by the device that corresponds to the multicast tree. Similarly, the device may also add a label included in the second label mapping message from the sender to an existing LFIB table entry stored by the device based on the first label mapping message. Procedure 600 then ends at step 630.

It should be noted that while certain steps within procedure 600 may be optional as described above, the steps shown in FIG. 6 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. For example, while procedure 600 is described with respect to the dual stack device first receiving a label mapping message that identifies both the IPv4 and the IPv6 address of the root node of the multicast tree and then receiving an IPv4-only or IPv6-only label mapping message, this ordering may be reversed in other embodiments.

The techniques described herein, therefore, provide for the merging of multicast trees across IPv4-only, IPv6-only, and dual stack (e.g., IPv4 and IPv6) devices. Notably, the tree merging processes described herein may avoid the duplication of packets along the same link. In addition, the techniques herein are backwards compatible and would not require any additional changes to be made to existing nodes, such as IPv4-only devices.

While there have been shown and described illustrative embodiments that provide for the merging of multicast trees, it is to be understood that various other adaptations and modifications may be made within the spirit and scope of the embodiments herein. For example, the embodiments have been shown and described herein with relation to certain computer networks. However, the embodiments in their broader sense are not as limited, and may, in fact, be used with other types of networks. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
receiving, at a first device in a multicast label distribution (mLDP) network, a first label mapping message that includes Internet Protocol version 4 (IPv4) and Internet Protocol version 6 (IPv6) addresses of a root node of a multicast tree and a unique identifier for the multicast tree;
storing, by the first device, information from the first label mapping message as a routing table entry;
receiving, at the first device, a second label mapping message from a second device that includes a unique identifier for the multicast tree and includes one of: the IPv4 address or the IPv6 address of the root node;
determining, by the first device, that the IPv4 address or the IPv6 address of the second label mapping message is associated with the multicast tree of the first label mapping message by determining that the unique identifier of the first label mapping message matches the unique identifier of the second label mapping message; and
adding, by the first device, the second device to the multicast tree, in response to determining that the second label mapping message is associated with the multicast tree by merging information from the second label mapping message into the routing table entry that includes information from the first label mapping message for the multicast tree.

2. The method as in claim 1, wherein the unique identifier of the first label mapping message and the unique identifier of the second label mapping message are matching opaque parameters for the multicast tree.

3. The method as in claim 1, wherein adding the second device to the multicast tree comprises:
merging, by the first device, an address of the second device into the routing table entry for the multicast tree.

4. The method as in claim 1, wherein the first and second label mapping messages comprise different label values.

5. The method as in claim 1, further comprising:
generating, by the first device, a new label mapping message based on the first label mapping message that includes the IPv4 and IPv6 addresses of the root node; and
sending, by the first device, the new label mapping message to an upstream device of the first device.

6. The method as in claim 1, wherein the second device is an IPv4-only device.

7. The method as in claim 1, wherein the second device is an IPv6-only device.

8. An apparatus, comprising:
one or more network interfaces to communicate with a multicast label distribution (mLDP) network;
a processor coupled to the network interfaces and adapted to execute one or more processes; and
a memory configured to store a process executable by the processor, the process when executed operable to:
receive a first label mapping message that includes Internet Protocol version 4 (IPv4) and Internet Protocol version 6 (IPv6) addresses of a root node of a multicast tree and a unique identifier for the multicast tree;
store information from the first label mapping message as a routing table entry;
receive a second label mapping message from a device in the mLDP network that includes a unique identifier for the multicast tree and includes one of: the IPv4 address or the IPv6 address of the root node;
determine that the IPv4 address or the IPv6 address of the second label mapping message is associated with the multicast tree of the first label mapping message by determining that the unique identifier of the first label mapping message matches the unique identifier of the second label mapping message; and
add the device to the multicast tree, in response to determining that the second label mapping message is associated with the multicast tree by merging information from the second label mapping message into the routing table entry that includes information from the first label mapping message for the multicast tree.

9. The apparatus as in claim 8, wherein the unique identifier of the first label mapping message and the unique identifier of the second label mapping message are matching opaque parameters for the multicast tree.

10. The apparatus as in claim 8, wherein the device is added to the multicast tree by:
merging an address of the device into the routing table entry for the multicast tree.

11. The apparatus as in claim 8, wherein the first and second label mapping messages comprise different label values.

12. The apparatus as in claim 8, wherein the process when executed is further operable to:
generate a new label mapping message based on the first label mapping message that includes the IPv4 and IPv6 addresses of the root node; and
send the new label mapping message to an upstream device of the apparatus.

13. The method as in claim 1, wherein the device is an IPv4-only device.

14. The method as in claim 1, wherein the device is an IPv6-only device.

15. A tangible, non-transitory, computer-readable media having software encoded thereon, the software when executed by a processor operable to:
receive a first label mapping message that includes Internet Protocol version 4 (IPv4) and Internet Protocol version 6 (IPv6) addresses of a root node of a multicast tree and a unique identifier for the multicast tree;
store information from the first label mapping message as a routing table entry;
receive a second label mapping message from a device that includes a unique identifier for the multicast tree and includes one of: the IPv4 address or the IPv6 address of the root node;
determine that the IPv4 address or the IPv6 address of the second label mapping message is associated with the multicast tree of the first label mapping message by determining that the unique identifier of the first label mapping message matches the unique identifier of the second label mapping message; and
add the device to the multicast tree, in response to determining that the second label mapping message is associated with the multicast tree by merging information from the second label mapping message into the routing table entry that includes information from the first label mapping message for the multicast tree.

16. The computer-readable media as in claim 15, wherein the unique identifier of the first label mapping message and the unique identifier of the second label mapping message are matching opaque parameters for the multicast tree.

17. The computer-readable media as in claim 15, wherein the device is added to the multicast tree by:
merging an address of the device into the routing table entry for the multicast tree.

18. The computer-readable media as in claim 15, wherein the first and second label mapping messages comprise different label values.

19. The computer-readable media as in claim 15, wherein the device is an IPv4-only device.

20. The computer-readable media as in claim 15, wherein the device is an IPv6-only device.

* * * * *

UNITED STATES PATENT AND TRADEMARK OFFICE
CERTIFICATE OF CORRECTION

PATENT NO. : 9,876,736 B2  
APPLICATION NO. : 14/527289  
DATED : January 23, 2018  
INVENTOR(S) : Ijsbrand Wijnands et al.

Page 1 of 1

It is certified that error appears in the above-identified patent and that said Letters Patent is hereby corrected as shown below:

In the Specification

In Column 2, Line 24, please amend as shown:  
on distance, signal strength, current operational status, In Column 2, Line 45, please amend as shown:  
Device 200 may include one or more network interfaces In Column 5, Line 11, please amend as shown:  
an FEC that identifies both the IPv4 and IPv6 root addresses In Column 5, Line 14, please amend as shown:  
sage 502, dual stack device R3 may store the corresponding Signed and Sealed this  
First Day of December, 2020

Andrei Iancu  
*Director of the United States Patent and Trademark Office*